(12) United States Patent
Fevergeon et al.

(10) Patent No.: US 9,840,320 B2
(45) Date of Patent: Dec. 12, 2017

(54) TRAILING EDGE DEVICE WITH BELL CRANK MECHANISM

(71) Applicant: The Boeing Company, Chicago, IL (US)

(72) Inventors: Matthew D M Fevergeon, Lake Stevens, WA (US); Jan A. Kordel, Redmond, WA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/577,848

(22) Filed: Dec. 19, 2014

(65) Prior Publication Data

US 2016/0176507 A1    Jun. 23, 2016

(51) Int. Cl.
| | |
|---|---|
| B64C 9/04 | (2006.01) |
| B64C 9/02 | (2006.01) |
| B64C 9/10 | (2006.01) |
| B64C 9/16 | (2006.01) |
| B64C 9/32 | (2006.01) |
| B64C 9/18 | (2006.01) |
| B64C 13/28 | (2006.01) |
| B64C 9/00 | (2006.01) |

(52) U.S. Cl.
CPC ............... *B64C 9/04* (2013.01); *B64C 9/02* (2013.01); *B64C 9/10* (2013.01); *B64C 9/16* (2013.01); *B64C 9/18* (2013.01); *B64C 9/323* (2013.01); *B64C 13/28* (2013.01); *B64C 2009/005* (2013.01); *Y02T 50/32* (2013.01)

(58) Field of Classification Search
CPC .... B64C 9/04; B64C 9/02; B64C 9/16; B64C 9/18; B64C 9/28; B64C 9/14; B64C 9/10; B64C 9/323; B64C 13/28
USPC .................................................... 74/469, 470
See application file for complete search history.

(56) References Cited

U.S. PATENT DOCUMENTS

| | | | | |
|---|---|---|---|---|
| 2,772,058 | A | * | 11/1956 | Grant ...................... B64C 21/02 244/216 |
| 3,874,617 | A | | 4/1975 | Johnson |
| 4,120,470 | A | | 10/1978 | Whitener |
| 4,353,517 | A | * | 10/1982 | Rudolph ................... B64C 9/20 244/216 |
| 4,542,869 | A | * | 9/1985 | Brine ....................... B64C 9/16 244/216 |

(Continued)

OTHER PUBLICATIONS

Search Report for related European Application No. EP15199859; report dated May 10, 2016.

*Primary Examiner* — Tien Dinh
*Assistant Examiner* — Alexander V Giczy
(74) *Attorney, Agent, or Firm* — Miller, Matthias & Hull LLP (57) ABSTRACT

A bell crank mechanism is configured to at least indirectly link movement of an aircraft wing spoiler-like hinge panel to the movement of a primary flight control device on an aircraft wing trailing edge. The aircraft wing is configured to be fixed to and to extend from an aircraft fuselage, the wing including a leading edge and a trailing edge. The primary flight control device is attached to the trailing edge, and any movement of the control device is directly subject to an aircraft input controller by a linear actuator. The moveable aerodynamic hinge panel, a secondary control device, is situated proximally to the primary flight control device, and the hinge panel is separately attached to the trailing edge. The bell crank mechanism slaves any hinge panel motion to movements of the primary control device.

4 Claims, 6 Drawing Sheets

(56) References Cited

U.S. PATENT DOCUMENTS

| | | | | |
|---|---|---|---|---|
| 4,566,657 A | * | 1/1986 | Grow | B64C 9/20 |
| | | | | 244/113 |
| 4,605,187 A | * | 8/1986 | Stephenson | B64C 9/04 |
| | | | | 244/216 |
| 4,702,442 A | * | 10/1987 | Weiland | B64C 9/16 |
| | | | | 244/216 |
| 4,717,097 A | * | 1/1988 | Sepstrup | B64C 3/50 |
| | | | | 244/215 |
| 4,784,355 A | * | 11/1988 | Brine | B64C 9/20 |
| | | | | 244/213 |
| 5,566,910 A | * | 10/1996 | Diekmann | B64C 13/28 |
| | | | | 244/215 |
| 7,766,282 B2 | | 8/2010 | Kordel et al. | |
| 8,038,103 B2 | | 10/2011 | Lacy et al. | |
| 8,061,652 B2 | * | 11/2011 | Bender | B64C 9/00 |
| | | | | 244/217 |
| 2005/0011994 A1 | * | 1/2005 | Sakurai | B64C 9/16 |
| | | | | 244/212 |
| 2007/0114328 A1 | * | 5/2007 | Lacy | B64C 9/16 |
| | | | | 244/34 R |
| 2007/0176051 A1 | | 8/2007 | Good et al. | |
| 2011/0073712 A1 | * | 3/2011 | Andreani | B64C 9/16 |
| | | | | 244/131 |
| 2013/0112814 A1 | * | 5/2013 | Yue | B64C 9/16 |
| | | | | 244/215 |
| 2013/0134262 A1 | * | 5/2013 | Maclean | B64C 9/02 |
| | | | | 244/212 |
| 2013/0320151 A1 | * | 12/2013 | Kordel | B64C 9/16 |
| | | | | 244/215 |
| 2014/0145039 A1 | * | 5/2014 | Beyer | B64C 9/10 |
| | | | | 244/215 |

* cited by examiner

TRAILING EDGE DEVICE WITH BELL CRANK MECHANISM

FIELD

The present disclosure relates generally to aircraft flight control structures and more specifically to apparatus configured for slaving the motion of a spoiler-like control device, such as a hinge panel, to that of a trailing edge control device.

BACKGROUND

Various control devices are used to effectively and efficiently maneuver aircraft during various phases of flight. Some control devices are directly attached to wings of an aircraft, such as ailerons adapted for controlling "roll", i.e. the rotational movement of an aircraft about its longitudinal axis. Spoilers may also be directly attached to aircraft wings to rapidly reduce wing lift when and as desired, particularly during various descent phases of a flight. Flaps are typically also attached directly to the wings to change their aerodynamic shapes for assuring stable flight control during slower speeds, such as during takeoff and landing phases of flight.

Figure 1:
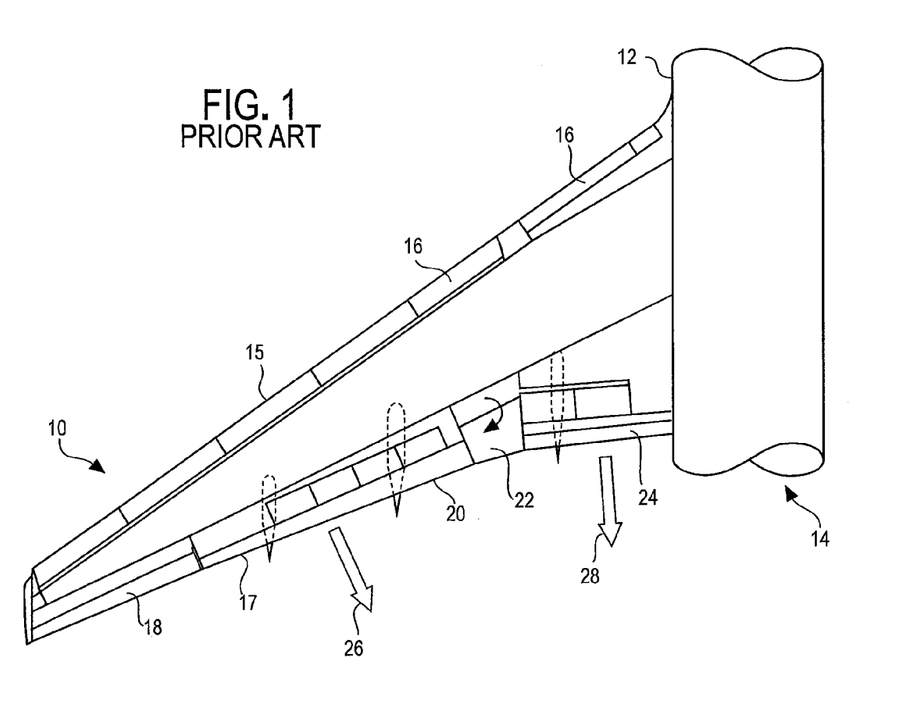
FIG. 1 is a fragmentary plan view of a wing of a commercial aircraft configured in accordance with the related art.

FIG. 1 is a fragmentary schematic view of a wing 10, attached to a fuselage 12, the wing and fuselage together depicting a portion of an aircraft 14 configured in accordance with the described related art. The wing 10 has a forward or leading edge 15 which may include deployable slats 16, as yet another wing control device. The wing also has a trailing edge 17 that includes outboard ailerons 18 and outboard flaps 20. The trailing edge 17 may also include inboard ailerons 22 and inboard flaps 24. As noted earlier, the ailerons are used for roll control of the aircraft 14, while the flaps are utilized to enhance lift control at lower speeds, e.g. for takeoffs and landings.

In some instances, the effective deployment of flaps may require translational movements in addition to their normal downward angular movements from stowed positions for creating spaces and/or gaps that need to be controlled for purposes of aerodynamic efficiency. Thus, arrows 26 and 28 indicate the directions, when deployed, of rearward translational movements of outboard flaps 20 and inboard flaps 24, respectively. Typically, ailerons, including the inboard aileron 22 require no translational movement, as do the dedicated flaps 20, 24.

The translational movement or extensions of outboard and inboard flaps 20, 24 of the convergent wing design of the aircraft wing 10 of FIG. 1 would pose an issue of angular interference, if the respective flaps were immediately adjacent each other. Such interference is avoided, however, by portion of the wing 10 that includes the inboard aileron 22, which is positioned between the flaps 20, 24 and involves no translational deployment.

In large turbofan jet aircraft, the functions of a flap and at least an inboard aileron may often be combined into a single or unitary control device called a flaperon. Since both flaps and ailerons are usually attached to the trailing edges of the aircraft wings, flaperons are also likewise attached. Thus, referring now to FIG. 2, the inboard aileron 22 of the aircraft 14 is shown attached to the trailing edge 32 of the wing 10, as shown at an interface 30 of the leading edge 34 of the inboard aileron 22. It should be noted that the inboard aileron 22 may be rotated about a hinge axis 38 into a rigid downward position 22" (shown in phantom); i.e. deployed from the stowed position shown to a fixed angle along the downward arc of angle B, to function solely as a flap, even though without a gap, since at relatively slower speeds, i.e. during takeoff and landing, the outboard ailerons may be solely relied upon to effectively control roll of the aircraft 14.

Figure 2:
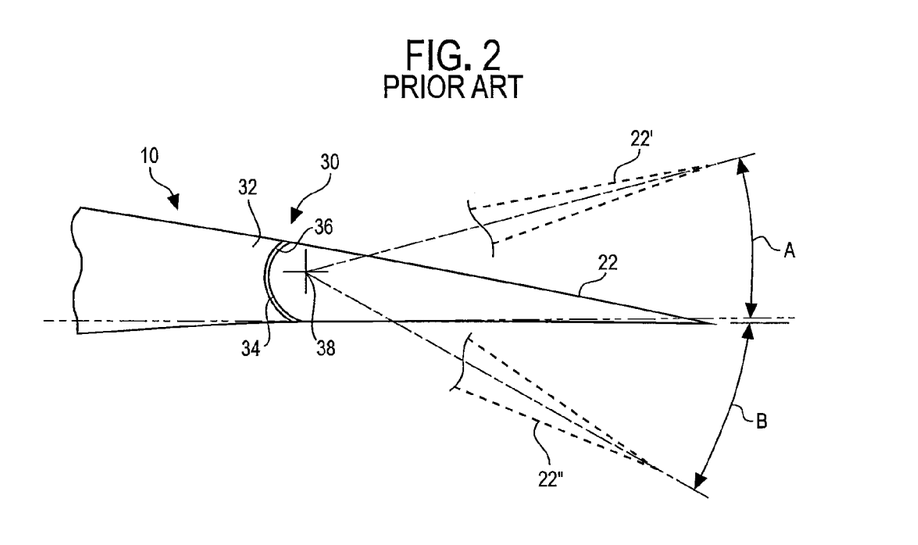
FIG. 2 is a fragmentary schematic elevation view of an inboard aileron of the commercial aircraft of FIG. 1.

Since the inboard aileron 22 also function as a flap, in aviation parlance such control device is also called a "flaperon", to the extent that it may be called upon to selectively perform both aileron or flap functions, depending on circumstances and/or phases of flight.

When functioning as an aileron, the so-called flaperon 22 is rotated upwardly along arc A from its stowed position as shown, up to and including a limit position 22' (shown in phantom), to the extent that a functional aileron must be free to move both upwardly and downwardly. Conversely, the flaperon 22 may be rotated downwardly along arc B from its stowed position, down to and including a limit position 22" (also shown in phantom). Finally, the trailing edge 32 of the wing 10 incorporates an aft-facing cove 36, a volume or space in which the leading edge 34 of the flaperon may rotate in close proximity, as depicted in FIG. 2 at the interface 30.

Figure 3:
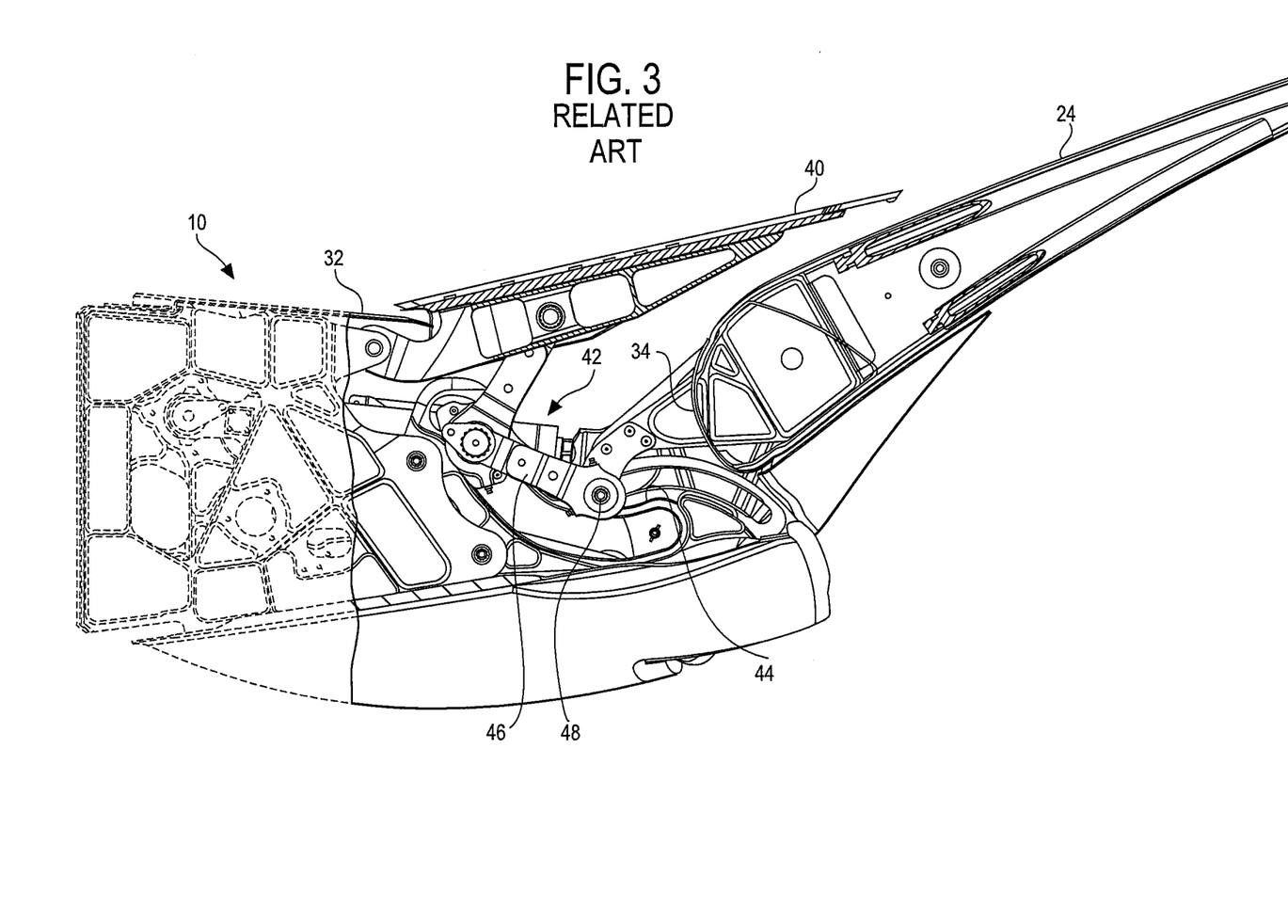
FIG. 3 is a fragmentary elevational view of a cross-section of an inboard flap of the commercial aircraft of FIG. 1.

Referring now to FIG. 3, the flap 24 may also be capable of acting as an aileron, and thus as a flaperon. Therefore, the flap 24 may also be variously called a flaperon 24. However, because deployment of the flaperon 24 may involve a translational extension, the physical structure involved in its deployment must accommodate translational in addition to pivotal movement. In the related art structure shown, a hinge panel 40, configured for management of aerodynamic air gaps created during the extension aspect of deployment of the flaperon 24 is coupled to the structure of the cam track mechanism 42 to assure desired angular positioning relative to the wing 10 and the flaperon 24.

Several challenges are presented by such structures adapted to satisfactorily accommodate both angular and translational motion, including the need to assure requisite fail-safe strength and robustness under occasional extreme loads, such as those associated with turbulence and other phenomena routinely encountered in flight. As such, the cam track mechanism 42 includes relatively heavy cam tracks 44 that define paths for cam track rollers 48 that are directly secured to roller links 46. Use of the cam track mechanism 42 has also necessitated the use of a technology called "fusing", for assuring safety in the event of "jamming" of any of the track rollers 38. Since jamming is an issue to be avoided at all costs, at least two roller links are typically riveted together in a cam track-style mechanism 42 (FIG. 3) for appropriate safety redundancy. Such links are designed to fail in a predictable manner, necessitating additional weight that would be preferably avoided.

Thus, it is desirable to provide novel aerodynamic gap control structures to accommodate both angular and translational movements of flaperons, but wherein such structures can retain robustness and yet be lighter in weight, in the face of increasingly stringent aircraft design requirements.

SUMMARY

In accordance with one aspect of the present disclosure, an aircraft wing configured to be fixed to, and extend from an aircraft fuselage, the wing having a leading edge and a trailing edge. The trailing edge includes an attached aerodynamic primary control device, the movement thereof subject to an input controller via an actuator. A moveable aerodynamic hinge panel, as a secondary control device, is proximal to the primary control device, the hinge panel being separately attached to the trailing edge, and a bell crank mechanism is configured to link movement of the hinge panel directly to movement of the control device.

In accordance with another aspect of the present disclosure, a bell crank mechanism is secured to an aircraft wing, the wing having a leading edge and a trailing edge. A primary control device is attached to the trailing edge, and a moveable aerodynamic hinge panel, as a secondary control device and separately attached to the trailing edge, is positioned proximally to the primary control device.

In accordance with another aspect of the present disclosure, a bell crank mechanism includes a plurality of links serially coupled together, each link having a pivot coupling at each end configured to join each link to an adjacent link via one of the pivot couplings, albeit without use of any cam tracks or rollers. As such, the bell crank mechanism is configured to link movement of the primary control trailing edge device to movement of a secondary device, such as a hinge panel for slaving the motion of the hinge panel to that of the trailing edge device.

In accordance with another aspect of the present disclosure, a method of slaving motion of a secondary control device, such as a hinge panel, to that of a trailing edge primary control device, such as a flap includes steps of providing a bell crank mechanism having a center link that includes a center pivot coupling; pivotally securing the center pivot coupling to an aircraft wing trailing edge structural member; providing a flap link, and fixing the flap link to extend from the trailing edge device to a first end of the center link of the bell crank mechanism. The method also includes providing a hinge panel link, and connecting the hinge panel link to extend from a hinge panel to a second end of the center link, as well as providing a linear actuator to directly move the primary control device, which movement in turn pivotally moves the links of the bell crank mechanism, to thereby indirectly control movement of the hinge panel.

The features, functions, and advantages disclosed herein can be achieved independently in various embodiments or may be combined in yet other embodiments, the details of which may be better appreciated with reference to the following description and drawings.

It should be understood that the drawings are not necessarily to scale, and that the disclosed embodiments are illustrated only schematically. It should be further understood that the following detailed description is merely exemplary and not intended to be limiting in application or uses. As such, although the present disclosure is, for purposes of explanatory convenience, depicted and described in only the illustrative embodiments presented, the disclosure may be implemented in numerous other embodiments, and within various other systems and environments not shown or described herein.

DETAILED DESCRIPTION

The following detailed description is intended to provide both apparatus and methods for carrying out the disclosure. Actual scope of the disclosure is as defined by the appended claims.

Figure 4:
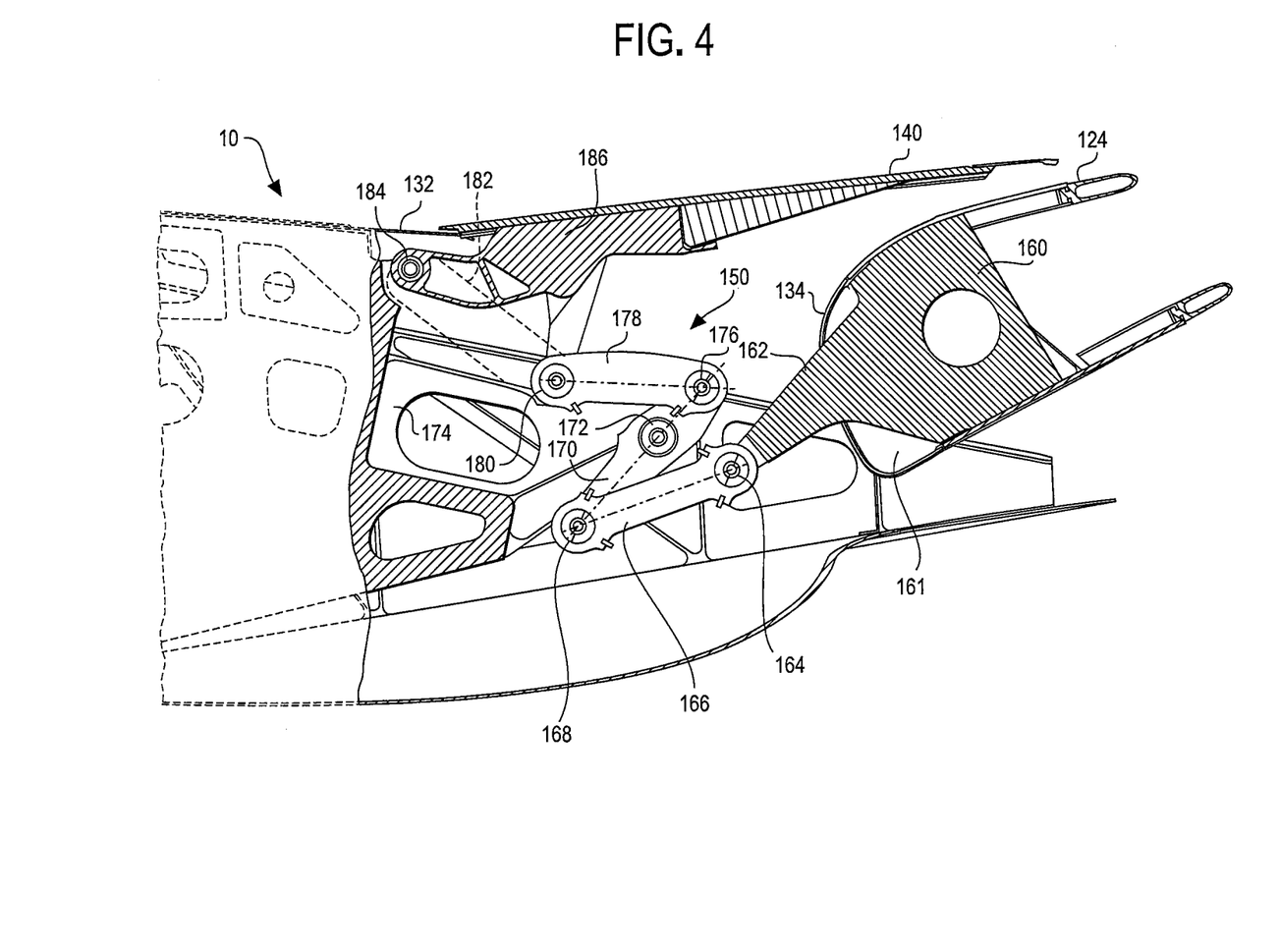
FIG. 4 is a fragmentary elevational view of a cross-section of an inboard flap constructed in accordance with a described embodiment of the present disclosure.

FIG. 4 is an elevational cross-section view of an inboard flap 124, as a primary flight control device, constructed in accordance with one described embodiment of the present disclosure. The inboard flap 124, shown in an upward position while functioning as a flaperon, is relatively movable with respect to the trailing edge 132 of the wing 110. A bell crank mechanism 150 effectively comprises a pair or series of four-bar linkages configured to control movement of a secondary flight control device, such as a separately movable hinge panel 140, thus eliminating the need for the related art cam track mechanism 42 described above.

Continuing reference to FIG. 4, a support header (also generally and commonly called a rib) 160 is a vertically oriented structural member within an interior space 161 of the flap 124. Typically there are a number of such support headers fixed in a parallel, spaced array. In the described embodiment the wing 110, at least two of such support headers 160 of each wing 110 includes an integral flap extension flange 162. Each of the flap extension flanges 162 is coupled directly to a single bell crank mechanism 150. A second bell crank 152, which in FIG. 6 has a location that is identified although its structure is hidden, is physically identical to the bell crank 150. Both bell crank mechanisms 150, 152 of each wing 110 operate in concert, as will be appreciated by those skilled in the art. As such, only one of the two mechanisms, i.e. bell crank mechanism 150, will be described herein.

The flap extension flange 162 is coupled via a coupling joint 164 to a bottom or flap link 166. At the forward end of the link 166 is a coupling joint 168 which pivotally secures the link 166 to a center link 170. At an intermediate portion thereof, the center link 170 is fixed to and rotates about a fixed coupling joint 172, which is secured to a support header 174, which is an integral part of the trailing edge 132 of the wing 110.

An upper coupling joint 176 of the center link 170 is configured to couple with an upper link 178. It will be appreciated that the latter provides a first, indirect connection to the hinge panel 140. The upper link 178 includes a forward coupling joint 180 adapted to connect directly to hinge panel link 182 (shown in phantom, since hidden behind support structures within the trailing edge 132). A forward coupling joint 184 of the hinge panel link 182 provides a direct connection to a hinge panel support header 186, a structural support member of the hinge panel 140, as depicted.

Figure 5:
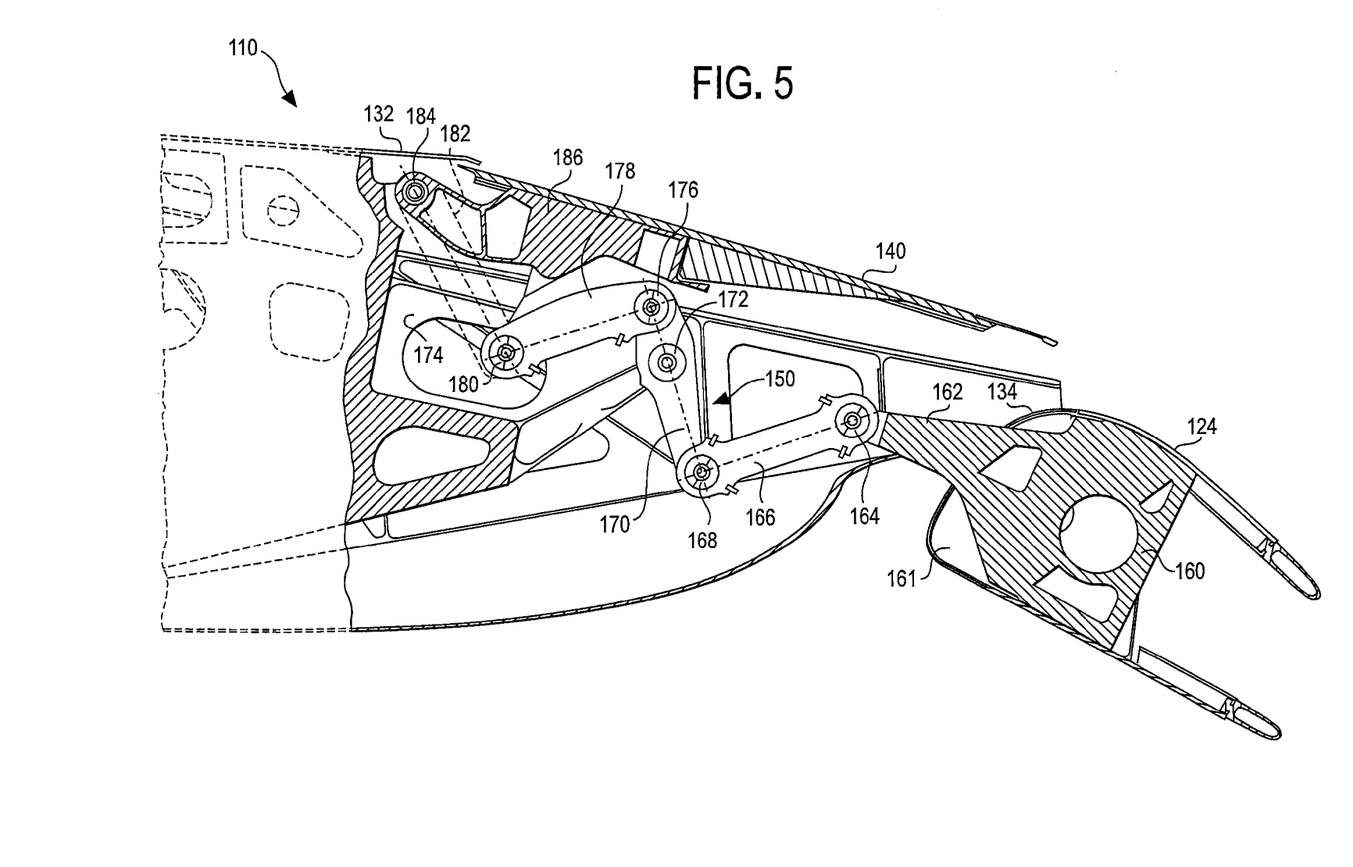
FIG. 5 is a fragmentary elevational view of a cross-section of the same inboard flap constructed in accordance with a described embodiment of the present disclosure, albeit shown in a different position.

The described elements, including all links and coupling joints (i.e., connections) are maintained in FIG. 5, wherein the inboard flap 124 is shown deployed downwardly, in either a flap or flaperon configuration, as already described. The center link 170 is pivotally connected to, and translationally fixed to the trailing edge 132, for supporting only pivotal movement of the center link relative to the trailing edge. For this purpose, the center link 170 has three connecting joints i.e. coupling joint 168 at one end thereof, shared with the flap link 166, the fixed coupling joint 172 at its center, about which it is pivotally secured to the support header 174, and the upper coupling joint 176, shared with the forward hinge panel link 182.

Those skilled in the art will appreciate that in order to support slaved movement of the bell crank mechanisms 150, 152 with respect to movement of the flap 124 relative to the trailing edge 132, there must be an additional pivotally fixed reactive connection between the flap 124 and the trailing edge 132.

Figure 6:
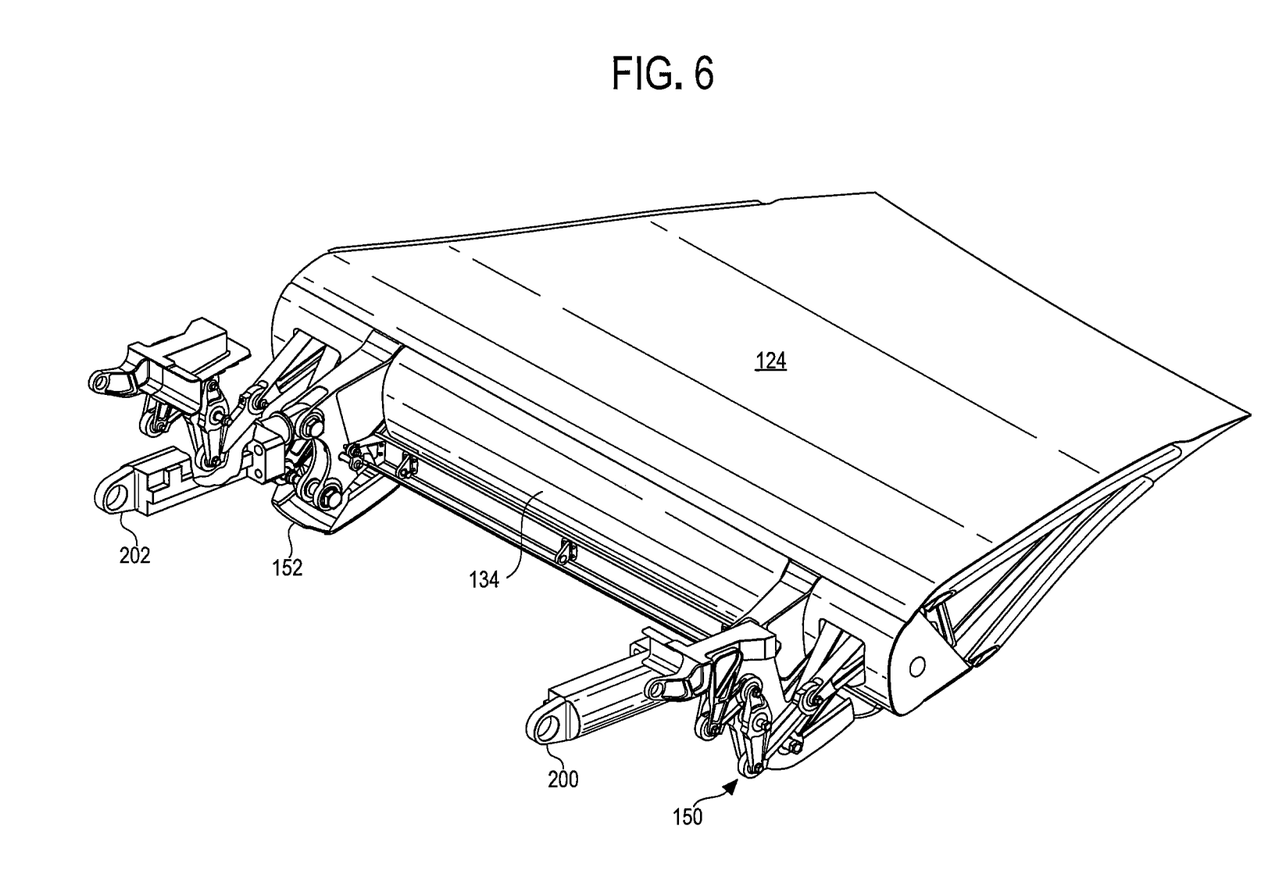
FIG. 6 is a perspective view of the same inboard flap of FIGS. 4 and 5.

Referring now to FIG. 6, a perspective view of the flap or flaperon 124 depicts the use of dual bell crank mechanisms 150 and 152 axially offset from a pair of spaced cooperating linear actuators 200 and 202. Those skilled in the art will appreciate that the actuators, at least in this described embodiment, are directly responsible for actual deployment, hence for the physical movement of the flap 124 relative to the trailing edge 132 between its limits, as shown in FIGS. 4 and 5. Each of the linear actuators 200, 202, as shown, includes a separate direct connection to the flaperon 124 to support primary flight control.

Figure 7:
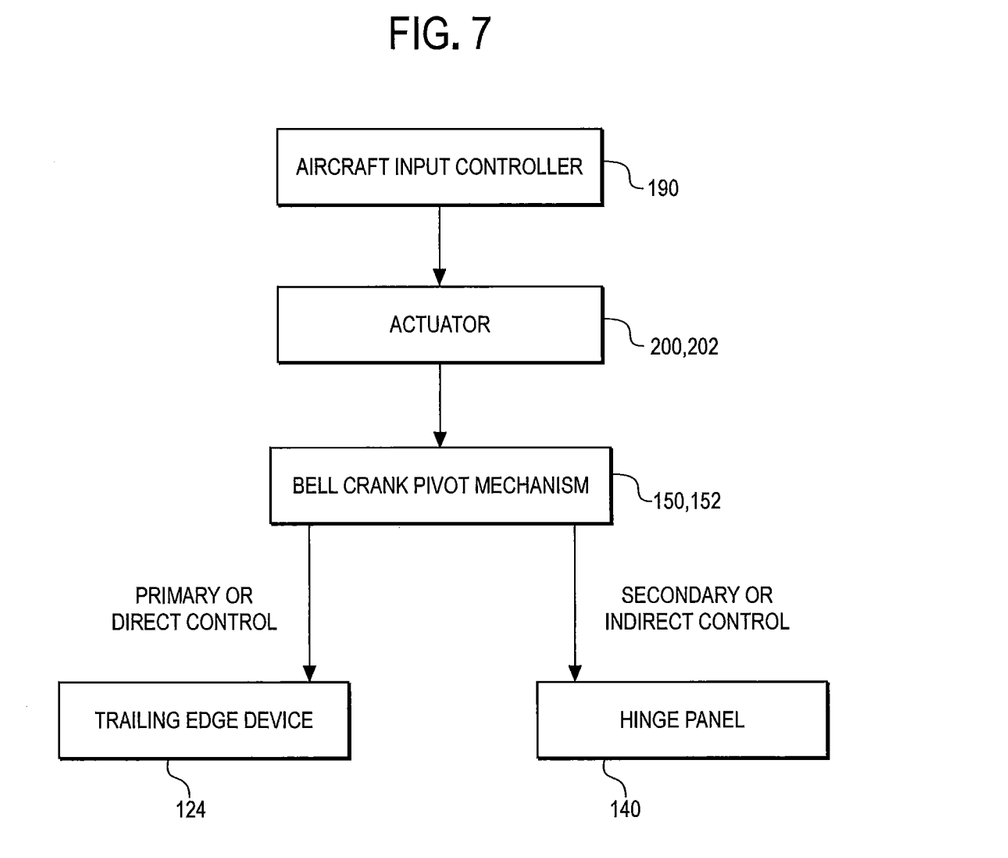
FIG. 7 is a flowchart depicting relationships among various aircraft components of the present disclosure.

FIG. 7 provides a flowchart depicting the relationship of the aircraft input controller 190 to the actuators 200, 202. To the extent that the actuators are directly connected to and engaged with the bell crank mechanisms 150, 152 (two per wing in the disclosed embodiment), and are thus configured to move all of the afore-described bell crank linkages in the described manner, it will be apparent to those skilled in the art that primary or direct control of the trailing edge device 124 is an intended response of the aircraft input controller 190, as described in detail herein. On the other hand, the input controller 190 is configured to provide a secondary or indirect control of the hinge panel 140 via a bell crank mechanism 150, 152, thus causing a slaved or follower movement of the hinge panel 140.

Finally, a method of causing a hinge panel 140 (or other spoiler-like structure), as a secondary aeronautical control device to follow the movement of a trailing edge primary flight control device such as a flap 124, includes steps of providing a bell crank mechanism 150, 152 having a center link 170 pivotally secured to a trailing edge 132 of an aircraft wing 110, and fixing a first or flap link 166 to extend from the flap 124 to a first end of the bell crank mechanism 150, 152. The method further includes utilizing a second or hinge panel link 182 extending from a hinge panel 140, through a third or upper link 178 to a second, or upper coupling joint 176 of the pivotal center link 170, and providing at least one linear actuator 200, 202 to move the flap 124 to thereby indirectly control movement of the hinge panel 140 through the motion of the bell crank mechanism 150, 152.

Those skilled in the art will appreciate that the structures described, including the various links 166, 170, 178, and 182, as associated with the hinge panel 140 may offer numerous benefits over the described cam track mechanism 42 of the related art. Moreover, via use of bell cranks 150, 152 for hinge panel control, not only is a cam track weight penalty avoided, but above-described fusing requirements can be avoided as well. Additional benefits include a reduction in manufacturing complexity associated with cam track mechanisms, and avoidance of issues inherent to cam track mechanisms, including gouging or fracture damage, and/or imposition of increased loading on structures, from deleterious accumulations of wear particle debris within cam track surfaces, as examples.

In addition, the disclosure may also cover numerous additional embodiments. For example, the lengths of each link may be adjusted to support various aerodynamically distinct flight circumstances and/or surface geometries for minimizing interference drag coefficients, including those related to skin friction, parasitic and separation drag, as well as wave drag. As such, particular forms and shapes of the links, for example, can be tailored to optimize variously desired gaps controlled by the hinge panel for management of and for optimizing flight performance characteristics.

What is claimed is:

1. A bell crank mechanism secured to an aircraft wing, the wing having a leading edge and a trailing edge, and having a primary control device attached to the trailing edge, and a movable aerodynamic hinge panel being separately attached to the trailing edge, the hinge panel being a secondary control device; wherein the bell crank mechanism comprises:
   a plurality of links serially coupled together, each link having a pivot coupling at each end, the pivot coupling joining adjacent links of the plurality of links,
   wherein one of the plurality of links comprises a center link having three connecting joints arranged along a single axis, the center link pivotally connected to, and translationally fixed to the trailing edge, for supporting only pivotal movement of the center link relative to the trailing edge,
   wherein two other of the plurality of links comprise a first hinge panel link and a second hinge panel link,
   wherein the first hinge panel link has opposed ends coupled respectively to the center link and the second hinge panel link, and the second hinge panel link is coupled directly to the hinge panel;
   a linear actuator configured to directly control the primary control device;
   wherein the bell crank mechanism is configured to link movement of the primary control device by the linear actuator to movement of the hinge panel for slaving the motion of the hinge panel to that of the primary control device.

2. The bell crank mechanism of claim 1, wherein the three connecting joints of the center link includes a center pivot coupling positioned intermediately between opposed ends of the center link, the center pivot coupling being translationally fixed to the trailing edge for permitting the pivotal movement of the center link relative to the trailing edge.

3. The bell crank mechanism of claim 2, wherein another one other of the plurality of links comprises a flap link, and wherein the opposed ends of the center link are each pivotally coupled to one end of the flap and first hinge panel links respectively via separate pivot couplings.

4. The bell crank mechanism of claim 1, wherein the linear actuator is directly controlled by an aircraft input controller.

* * * * *